United States Patent
Moldestad et al.

(10) Patent No.: US 7,864,748 B2
(45) Date of Patent: Jan. 4, 2011

(54) TUNNELLING TDM TRAFFIC OVER MPLS

(75) Inventors: Terje Moldestad, Arendal (NO); Per Eirik Heimdal, Grimstad (NO); Halvard Widerøe Njølstad, Søgne (NO); Berner Vegge, Lyngdal (NO)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 1302 days.

(21) Appl. No.: 10/540,353

(22) PCT Filed: Dec. 27, 2002

(86) PCT No.: PCT/NO02/00496

§ 371 (c)(1),
(2), (4) Date: Feb. 10, 2006

(87) PCT Pub. No.: WO2004/059927

PCT Pub. Date: Jul. 15, 2004

(65) Prior Publication Data

US 2006/0262774 A1 Nov. 23, 2006

(51) Int. Cl.
*H04L 12/28* (2006.01)
(52) U.S. Cl. ................................... 370/351
(58) Field of Classification Search .............. 370/351, 370/352, 356; 379/90.01, 93.01, 93.09
See application file for complete search history.

(56) References Cited

U.S. PATENT DOCUMENTS

| | | | |
|---|---|---|---|
| 6,466,591 B1* | 10/2002 | See et al. | 370/535 |
| 6,738,374 B1* | 5/2004 | Olkkonen et al. | 370/389 |
| 6,842,513 B1* | 1/2005 | Androski et al. | 379/220.01 |
| 7,002,963 B1* | 2/2006 | Buyukkoc et al. | 370/395.1 |
| 7,372,870 B2* | 5/2008 | Huang et al. | 370/466 |
| 7,394,820 B1* | 7/2008 | Dianda | 370/401 |
| 7,568,047 B1* | 7/2009 | Aysan et al. | 709/238 |
| 7,697,461 B2* | 4/2010 | Shi et al. | 370/258 |
| 2001/0055300 A1* | 12/2001 | Chen | 370/352 |
| 2002/0097726 A1* | 7/2002 | Garcia-Luna-Aceves et al. | 370/395.31 |
| 2002/0097730 A1* | 7/2002 | Langille et al. | 370/401 |
| 2002/0141386 A1* | 10/2002 | Minert et al. | 370/352 |
| 2003/0231617 A1* | 12/2003 | Ubale | 370/352 |
| 2004/0028064 A1* | 2/2004 | Cetin et al. | 370/409 |
| 2004/0151181 A1* | 8/2004 | Chu et al. | 370/392 |
| 2004/0202148 A1* | 10/2004 | Kuehnel | 370/352 |
| 2004/0213205 A1* | 10/2004 | Li et al. | 370/352 |
| 2004/0213206 A1* | 10/2004 | McCormack et al. | 370/352 |

(Continued)

FOREIGN PATENT DOCUMENTS

WO   WO 01 86864 A   11/2001

(Continued)

*Primary Examiner*—Chi H Pham
*Assistant Examiner*—Fan Ng
(74) *Attorney, Agent, or Firm*—Roger S. Burleigh

(57) ABSTRACT

The present invention provides a method for transporting TDM traffic through packet switched networks. The nodes of the packet switched network are MPLS adjusted, and the timeslots of a TDM connection are encapsulated in data frames in the transmitting circuit switched node, and added one or more MPLS label(s) by means of the MPLS label stacking concept to identify the fixed path through the packet switched network and to uniquely address the PCM system of the circuit switched receiving node. The present invention is particularly useful for transmission of real-time data traffic through IP network.

6 Claims, 5 Drawing Sheets

U.S. PATENT DOCUMENTS

2005/0141417 A1* 6/2005 Huang et al. ................. 370/229
2006/0262774 A1* 11/2006 Moldestad et al. ........... 370/352
2007/0230368 A1* 10/2007 Shi et al. ..................... 370/254
2008/0304476 A1* 12/2008 Pirbhai et al. ................ 370/356
2009/0175274 A1* 7/2009 Aggarwal et al. ............ 370/390

FOREIGN PATENT DOCUMENTS

| WO | WO 01 87000 A | 11/2001 |
| WO | WO 02 075536 A | 9/2002 |
| WO | WO 02 096020 A | 11/2002 |

* cited by examiner

TUNNELLING TDM TRAFFIC OVER MPLS

FIELD OF THE INVENTION

The present invention is related to voice and data communication, in particular to transporting TDM traffic through packet switched networks.

BACKGROUND OF THE INVENTION

The telecom technology is currently migrating towards an "all IP" infrastructure. There are economical advantages in maintaining a package-based network only. This could result in solutions where today's real time applications are transported over package bearers like i.e. IP, MPLS etc. However, Package based networks were designed for data transmission and not for real time traffic. Important real-time parameters to consider are throughput, jitter (variable delay), losses etc.

The main problem by transporting real time traffic over package networks is to ensure that the quality of the speech data is at least as good as today's solution. The use of e.g. voice over IP involves many protocols (see FIG. 2) each adding a lot of overhead, thus making the transport inefficient. Jitter and packet-loss will degrade the signal quality, as well as overall delay. Jitter can arise when packets take different routes through the network, as may occur in IP networks. This may also cause packets arriving in wrong sequence. Another challenge is to secure sufficient available resources between the two communicating hosts (this is certainly no problem on circuit switched lines, where a constant sufficient capacity is always granted). One method to achieve proper quality is to use MPLS.

Unlike typical routing, MPLS works on the idea of flows, or Forwarding Equivalence Classes (FECs) in MPLS parlance.

Flows consist of packets between common endpoints identified by features such as network addresses, port numbers, or protocol types. Traditional routing reads the destination address and looks at routing tables for the appropriate route for each packet. Each router populates these routing tables by running routing protocols—such as RIP, OSPF, or Border Gateway Protocol (BGP)—to identify the appropriate route through the network.

By contrast, MPLS calculates the route once on each flow (or FEC) through a provider's network. The MPLS-compatible router embeds a label consisting of short, fixed-length values inside each frame or cell. Along the way, routers use these labels to reduce look-up time and improve scalability.

MPLS provides transmission of all packets over the same path (LSP) through the network, thus avoiding packets out of order and jitter. Each LSP can be set up with different QoS parameters.

The MPLS Protocol is shown in FIG. 1. The overhead (10) is 4 bytes and consists of the fields Label (20) (20 bits), Exp (30), (3 bits), S (40) (1 bit) and TTL (50) (8 bits). EXP means EXPerimental bits and may be used when mapping traffic classes from i. e. IP Differentiated Services field (ToS). The S bit (40) indicates Stack depth of MPLS. When S is set, it means that this is the innermost stack. TTL means Time To Live and is adapted from the Ipv4 indicating how many hops the packet is allowed to travel before it is being terminated.

The standard way of using MPLS is to use it in addition to various protocols, just adding more packet overhead for control information. The application type decides what the rest of the protocol stack looks like. Real time traffic has other requirements than non-real-time traffic. Voice traffic may use a protocol stack (100) as shown in FIG. 2.

All protocol layers have their functionality, and they are all adding extra information to the payload, enabling the equipment to route the traffic the correct way and assign priority.

Based on the protocols and header information, the MPLS label will have a bit-field, setting the right priority for the current packet.

One common problem for all the protocols is that the data link is using a lot of capacity just for transferring overhead information. An overhead of 20% or more is possible for real time traffic, when using the protocol stack shown in FIG. 2. This gives a poor utilisation of the network capacity.

Consider for example a packet with user payload of 256 bytes, which could be a typical packet size for real time traffic and requirements regarding delay, as it will be for voice traffic. After the protocol overhead has been added, the packet has increased to 312 bytes, which will be the payload for the SDH/SONET/ATM/Ethernet packet. This means that the packet size has increased by 21.9%.

SUMMARY OF THE INVENTION

It is an object of the present invention to provide an arrangement that eliminates the drawbacks described above.

In particular, the present invention provides a method for transporting TDM (Time Division Multiplex) time slots of a circuit switched connection from a first circuit switched node to a second circuit switched node through a packet switched network including a number of packet switched nodes, the circuit and packet switched nodes are all having the characteristics of a Multiprotocol Label Switch, which method includes at least the following steps:

in the first circuit switched node, encapsulating the time slots in a data frame adjusted to be transferred in the packet switched network, stacking the data frame with at least one inner MPLS label uniquely addressing a PCM system within the second circuit switched node and/or at least one outer MPLS label identifying a fixed path of consecutive packet switched nodes within the packet switched network.

BRIEF DESCRIPTION OF THE DRAWINGS

In order to make the invention more readily understandable, the discussion that follows will refer to the accompanying drawings.

DESCRIPTION OF PREFERRED EMBODIMENTS

In circuit switched TDM based telecom systems, timeslots are providing data for one connection. One timeslot represents a 64 kbit/s connection. The time slots are grouped together in frames of 32 or 24 timeslots. These frames are transmitted to the receiving telecom switch. When the networks are changed to be packet switched, the total capacity could be reduced as the extra overhead is added.

If the packet switched network offers MPLS in all nodes, there is no need for extra overhead at all. The user data should be grouped together in frames of 24 or 32 timeslots. Other sizes of the groups are also possible, down to one timeslot per packet and up to as many as the network operator allows. The more timeslots in one packet, the longer the delay will occur to be because of the need of buffering the data before it is sent. If the packets are too small, the overhead/user-data ratio will be poor. According to the present invention, a predefined MPLS label will be added to the user data. The MPLS label is an address tag, which makes all the packets traverse the network in the same route. To make it possible for the receiving end of the LSP to find out which PCM system the packet belongs to, the present invention provides a mapping between MPLS label and the PCM system through a mapping table. This mapping table could be set up manually.

Further, to reduce the number of labels to be handled by the MPLS network, the present invention utilizes the label-stacking concept of MPLS. This can be done by having one label for each exchange or for each board terminating the incoming bit stream in the exchange and at the same time having one label for each PCM system within the exchange. These labels per PCM system are then at a lower layer in the label stack and will only be visible at the endpoints of the LSP when the outer label has been removed, as the outer label is used for switching packets between routers of the LSP.

Figure 1:
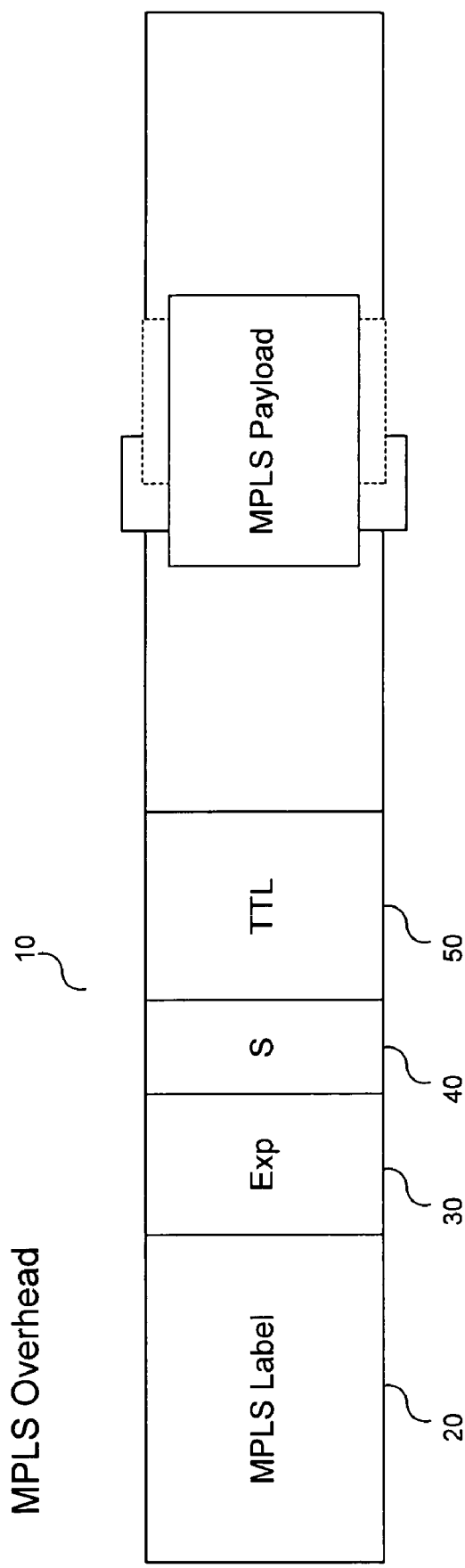
FIG. 1 shows an MPLS protocol stack.
Figure 2:
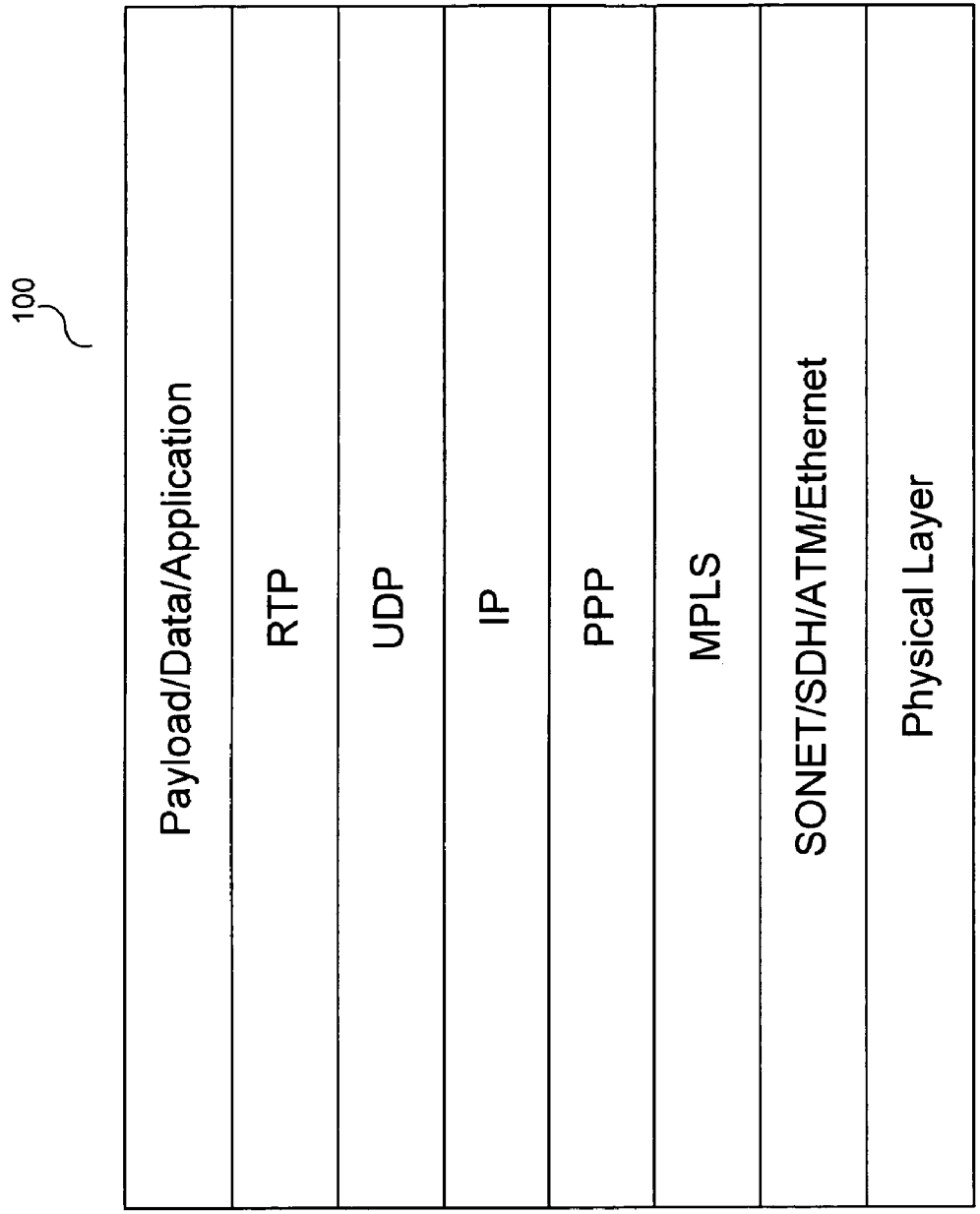
FIG. 2 shows a typical protocol stack for voice traffic.
Figure 3:
FIG. 3 shows how the protocol stack of FIG. 1 may look like by use of the present invention.
Figure 4:
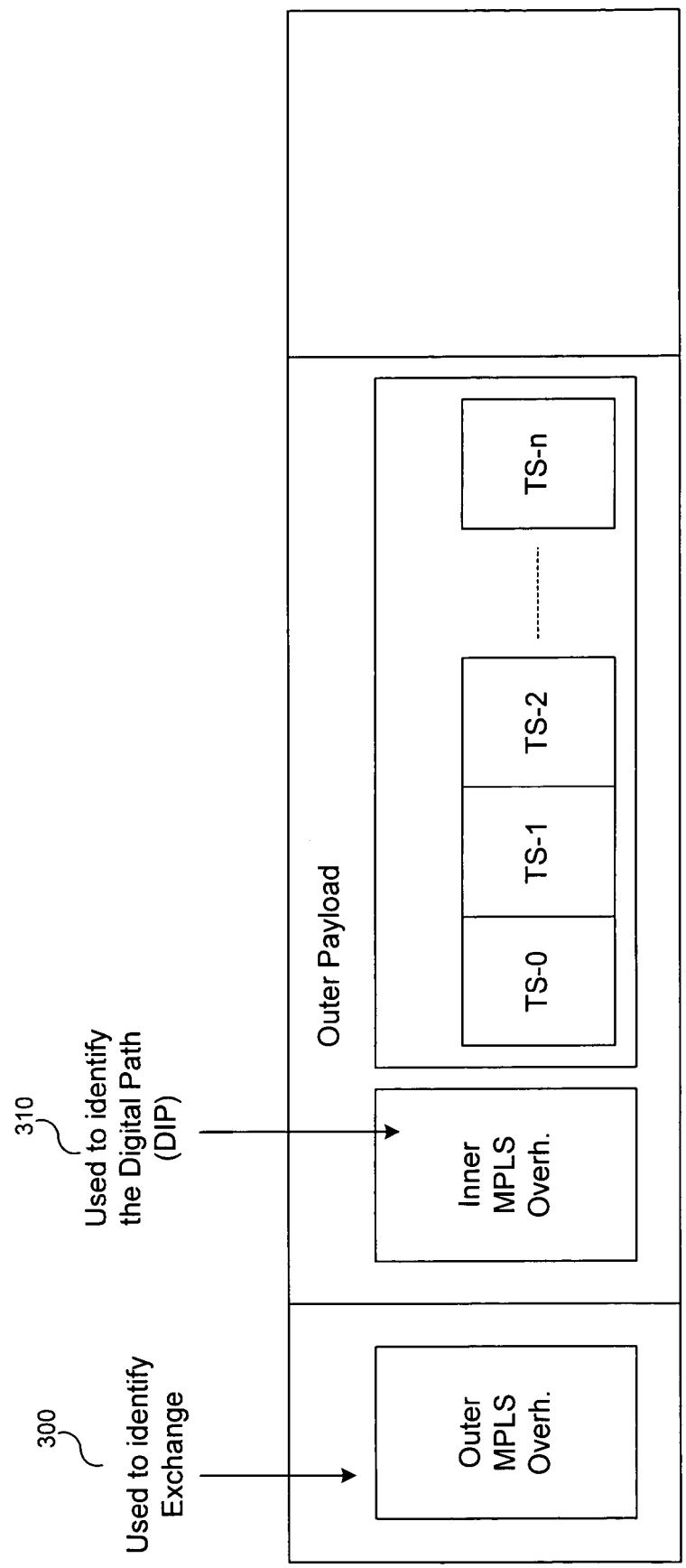
FIG. 4 shows the MPLS label stacking according to a preferred embodiment of the present invention.

FIG. 4 shows an example where the stack depth is 2 (which of course possibly also could be more/less if reasonable). FIG. 1 shows the details on how the MPLS protocol is defined. One possible scenario could be as follows: Assume that a call is about to be established to Exchange OSLO, which could have five 155Mbit/s SDH terminations (155 Mbit/s=63 times 2 Mbit/s "effective" payload, the rest is overhead). The outer MPLS label (300) will then identify the Exchange OSLO. Arriving at OSLO, the outer label is removed and the Exchange will investigate the inner MPLS label (310) representing the actual PCM system. In this example, 5*63=315 PCM systems would be available. Each PCM system needs to have its own label unique within exchange OSLO. Hence, at OSLO there must be a table describing the mapping between the incoming MPLS label and corresponding PCM system.

The source host (since it supports MPLS, it is called a Label Edge Router) is sending the packets to the first MPLS router, which is called LSR (Label Switched Router). This LSR sends the packets to the next LSR, and the address for the next hop is based on the MPLS label attached to the packet. The entire route is predefined by the label that the host is using. The packet ends up in the destination host. The label is stripped off the packet, and the original data is extracted. The destination host is a LER. As the route is predefined and all packets are traversing the net on the same route, all packets will arrive in the same order as they were sent. As the telecom switch will send the packets at a constant rate, the receiving end will detect when packets are lost.

One of the main advantages with the present invention is that there is less overhead added to each packet, thus avoiding a large percentage of overhead in the packet switched network. Using IP header (20 bytes), RTP (16 bytes), UDP (8 bytes) for all packets, would make it "necessary" to send "large" packets to avoid a bad utilization of the network capacity, i.e. bad overhead/payload ratio. In contrary, when using one MPLS frame, 4 bytes of overhead are added to each packet, and if the label-stacking concept is used to reduce the number of labels in the system (as described above) 8 bytes of overhead is added.

This means that when only MPLS labels are added, smaller packets can be used and the network utilization is still acceptable.

Figure 5:
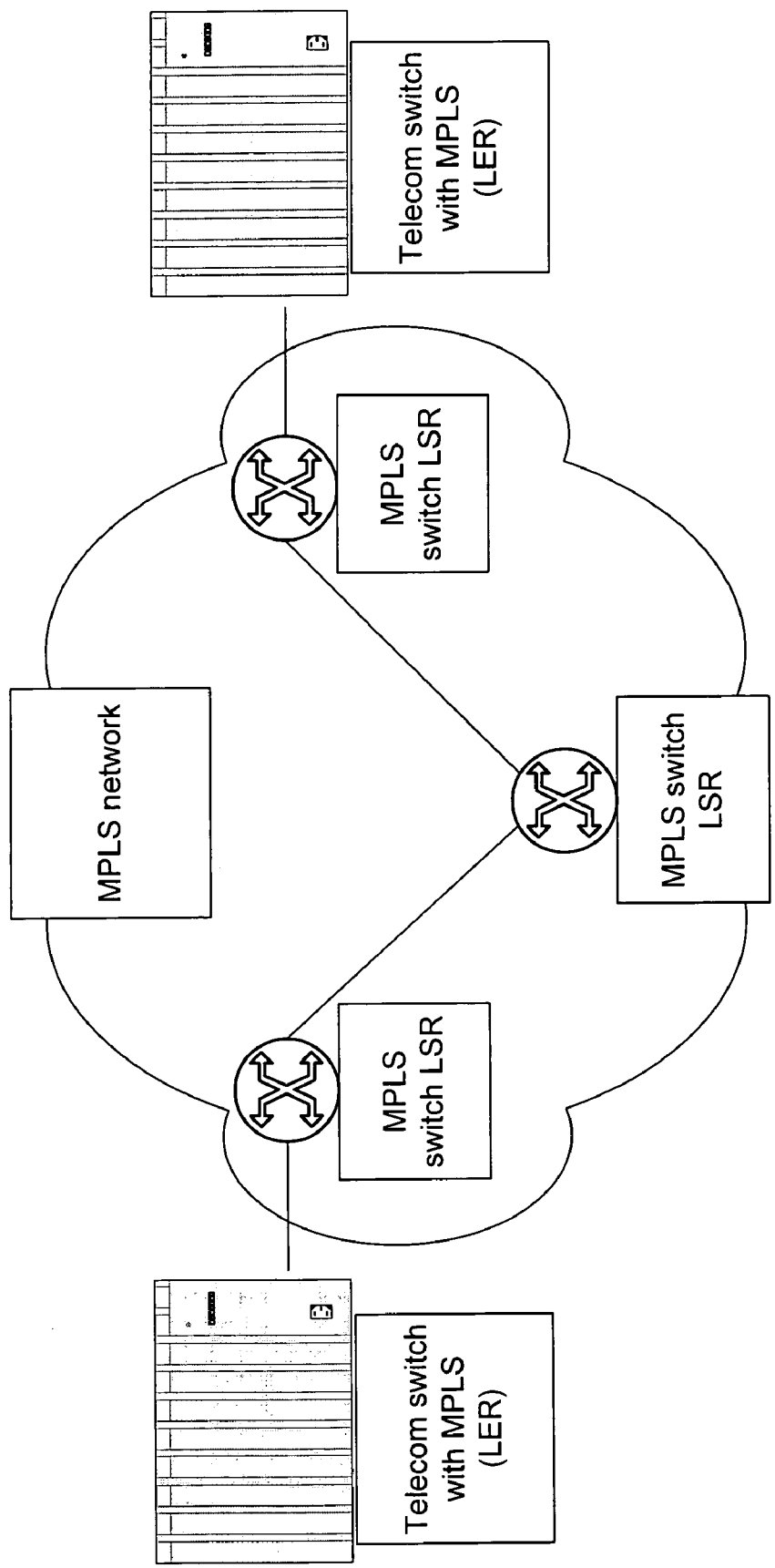
FIG. 5 is a view of circuit switched telecom nodes connected to a MPLS adjusted packet switched network.

The present invention provides transportation of real-time traffic (e. g. speech) over packet switched networks with a quality approximately as good as for circuit switched lines without occupying more network capacity and as further illustrated in FIG. 5.

The present invention is applicable for all types of traffic in packet switched networks. The hosts should only be used for one application, as there is no information in the packets regarding the datatype or which application to use on the data.

The data packets do not need to be of a constant length. Once the header(s) is (are) stripped off, the rest is user data.

The main idea of the present invention is to have the LSPs terminated in the telephone exchanges, but the solution can also be used when the LSPs are terminated in nodes outside the exchanges, e.g. in routers. In such a case, the nodes terminating the LSPs must have a mapping table between labels and interfaces (e.g. PDH/SDH-interfaces) so that the nodes know where to forward an incoming MPLS packet and vice versa.

More than one header can be attached to the data in the transmitting end. The entire label stack for all the routers can be attached in the first node. Then the rest of the nodes do not need to swap the label on the incoming packet, but simply just pop the label at the top of the stack and forward the packet to the next LSR.

The 20-bit field MPLS Label carries the actual value of the Label. When a labeled packet is received, the label value at the top of the stack is investigated, and a look up is carried out. As a result of a successful lookup the following information is obtained: a) the next hop to which the packet is to be forwarded; b) the operation to be performed on the label stack before forwarding. The latter operation may be to replace the top label stack entry with another one, or to pop an entry off the label stack, or to replace the top label stack entry and then to push one or more additional entries on the label stack. The operation depends on whether the label includes the address of the whole remaining path (no new entry is required), or if it should include the address of the next node only.

ABBREVIATIONS

ATM Asynchronous Transfer Mode
EXP Experimental bits in MPLS protocol
IP Internet Protocol
LER Label Edge Router
LSP Label Switched Path
LSR Label Switch Router
RIP Routing Information Protocol
RTP Real Time Protocol
MPLS Multiprotocol Label Switch
OSPF Open Shortest Path First
PDH Plesiochronous Digital Hierarchy
PPP Point-to-Point Protocol
SDH Synchronous Digital Hierarchy
SONET Synchronous Optical Network
S Stack Depth in the MPLS protocol
TDM Time Division Multiplex
TSx Time Slot x
TTL Time To Live
UDP User Datagram Protocol
VOIP Voice over IP

The invention claimed is:

1. A method for use in a telecommunications network, comprising the steps of:
   transporting Time Division Multiplex (TDM) time slots of a circuit switched connection from a first circuit switched node to a second circuit switched node through a packet switched network including a number of packet switched nodes, the circuit and packet switched nodes based on a Multiprotocol Label Switch (MPLS), further comprising the steps of:
   in the first circuit switched node, encapsulating the time slots in a data frame adjusted to be transferred in the packet switched network;
   stacking the data frame with (i) at least one inner MPLS label uniquely addressing a PCM system within the second circuit switched node and (ii) at least one outer MPLS label identifying a fixed path of consecutive packet switched nodes within the packet switched network, said outer label includes addresses of all the packet switched nodes included in the fixed path in addition to an address of the second circuit switched node; and
   in the second circuit switched node, removing the outer MPLS label and transferring the time slots to the PCM system addressed by the inner label.

2. The method according to claim 1, comprising the steps of:
   in the first node, including the address of the first packet switched node of the fixed path as the outer label; and
   in each of the consecutive packet switched nodes, exchanging the content of the outer label with the address of the packet switched node following current packet switched node or, if current packet switched node is the last packet switched node of the fixed path, with the address of the second circuit switched node.

3. The method according to claim 1, wherein that the first and the second circuit switched nodes are Label Edge Routers (LERs) and the packet switched nodes are Label Switched Routers (LSRs).

4. The method according to claim 1, wherein that the circuit switched connection is a 64 kbit/s connection and the number of time slots in the data frame is 32 or 24.

5. The method according to claim 1, wherein the first circuit switched node and the second circuit switched node are exchanges in a public telephone network.

6. The method according to claim 1, wherein that the circuit switched connection is a real-time connection like a telephone call connection.

* * * * *

UNITED STATES PATENT AND TRADEMARK OFFICE
CERTIFICATE OF CORRECTION

| | | |
|---|---|---|
| PATENT NO. | : 7,864,748 B2 | Page 1 of 1 |
| APPLICATION NO. | : 10/540353 | |
| DATED | : January 4, 2011 | |
| INVENTOR(S) | : Moldestad et al. | |

It is certified that error appears in the above-identified patent and that said Letters Patent is hereby corrected as shown below:

In Column 1, Line 55, delete "(30)," and insert -- (30) --, therefor.

In Column 1, Line 60, delete "Ipv4" and insert -- IPv4 --, therefor.

In Column 4, Line 67, delete "VOIP" and insert -- VoIP --, therefor.

Signed and Sealed this
Twenty-fourth Day of May, 2011

David J. Kappos
*Director of the United States Patent and Trademark Office*